| (12) | United States Patent<br>Makino et al. | (10) Patent No.: US 8,979,082 B2<br>(45) Date of Patent: Mar. 17, 2015 |
|---|---|---|

(54) VIBRATION DAMPING BUSHING AND MANUFACTURING METHOD THEREOF

(75) Inventors: Takashi Makino, Kasugai (JP); Chiharu Tanaka, Wako (JP); Akira Kobayashi, Wako (JP)

(73) Assignees: Tokai Rubber Industries, Ltd., Komaki-Shi (JP); Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 13/491,271

(22) Filed: Jun. 7, 2012

(65) Prior Publication Data

US 2012/0326368 A1 Dec. 27, 2012

(30) Foreign Application Priority Data

Jun. 21, 2011 (JP) ................. 2011-137161

(51) Int. Cl.
*F16F 15/08* (2006.01)
*F16F 1/38* (2006.01)
*B60G 7/00* (2006.01)

(52) U.S. Cl.
CPC ............... *F16F 1/3828* (2013.01); *B60G 7/001* (2013.01); *F16F 1/3863* (2013.01); *B60G 2204/41* (2013.01)
USPC ....................... 267/293; 267/140.12

(58) Field of Classification Search
CPC ......... F16F 1/38; F16F 1/3807; F16F 1/3828; F16F 1/3842; B60G 2204/4104
USPC ....................... 267/140.12, 141.1–141.3, 293; 280/124.169, 124.177
See application file for complete search history.

(56) References Cited

U.S. PATENT DOCUMENTS 2,324,997 A * 7/1943 Brown .......................... 267/269
2,659,619 A * 11/1953 Kishline et al. ............... 267/293
4,762,310 A * 8/1988 Krajewski et al. .......... 267/141.2

(Continued)

FOREIGN PATENT DOCUMENTS

| DE | 19720639 A1 * 11/1998 | ................ F16F 1/38 |
| EP | 0 771 964 A1 | 5/1997 | |
| GB | 2156469 A * 10/1985 | .............. F16B 39/22 |

(Continued)

OTHER PUBLICATIONS

Dec. 30, 2013 Office Action issued in Chinese Patent Application No. 201210209868.3 (with translation).

(Continued)

*Primary Examiner* — Bradley King
*Assistant Examiner* — Stephen Bowes
(74) *Attorney, Agent, or Firm* — Oliff PLC (57) ABSTRACT

A vibration damping bushing including: an inner axial member; an outer cylindrical member through which the inner axial member is inserted; a main rubber elastic body elastically connecting the two members; and a stopper member that is fitted onto the inner axial member as a component of a first stopper mechanism that limits relative displacement of the inner axial member against the outer cylindrical member to one side in an axial direction. The inner axial member is formed with a latching depression that opens toward an outer periphery thereof, and the stopper member is provided with a latching piece that protrudes outward in the axial direction. The latching piece is engaged with the latching depression so as to provide a slipping out prevention mechanism for preventing the stopper member from slipping out from the inner axial member.

8 Claims, 4 Drawing Sheets

(56) References Cited

U.S. PATENT DOCUMENTS 7,195,438 B2 * 3/2007 Harbin et al. ............... 411/361
7,306,393 B2 * 12/2007 Erdogan ...................... 403/133

FOREIGN PATENT DOCUMENTS

| | | | |
|---|---|---|---|
| JP | 03020132 A * | 1/1991 | ............... F16F 1/38 |
| JP | A-H04-088229 | 3/1992 | |
| JP | A-10-318312 | 12/1998 | |
| JP | A-2003-294084 | 10/2003 | |
| JP | A-2007-17002 | 1/2007 | |
| JP | 2007-269128 A | 10/2007 | |
| JP | A-2008-25808 | 2/2008 | |

OTHER PUBLICATIONS

Jul. 21, 2014 Office Action issued in Chinese Patent Application No. 201210209868.3 (with translation).

Dec. 17, 2014 Office Action issued in Japanese Application No. JP-A-2011-137161.

* cited by examiner

VIBRATION DAMPING BUSHING AND MANUFACTURING METHOD THEREOF

INCORPORATED BY REFERENCE

The disclosure of Japanese Patent Application No. 2011-137161 filed on Jun. 21, 2011 including the specification, drawings and abstract is incorporated herein by reference in its entirety.

BACKGROUND OF THE INVENTION

1. Field of the Invention

The present invention relates to a vibration damping bushing used for vibration damping connection, for example, between a suspension arm and a vehicular body in an automobile suspension mechanism. The present invention also relates to a method for manufacturing the same.

2. Description of the Related Art

Conventionally, in an automobile suspension mechanism and the like, a vibration damping bushing has been disposed at a connecting portion between a suspension arm that supports wheels and a vehicular body, and the suspension arm and the vehicular body are connected in a vibration damping fashion via the vibration damping bushing. One example of the vibration damping bushing is disclosed in Unexamined Japanese Patent Application Publication No. JP-A-2003-294084, for example, wherein an inner axial member to be mounted to the vehicular body is inserted through an outer cylindrical member fitted into the mounting cylinder of the suspension arm, forming a structure consisting of these inner axial member and the outer cylindrical member connected in a vibration damping fashion by a main rubber elastic body in a cylindrical form.

The vibration damping bushing described in JP-A-2003-294084 is provided with a stopper mechanism for limiting relative displacement between the inner axial member and the outer cylindrical member in the axial direction for the purpose of improving running stability of the vehicle and securing durability of the main rubber elastic body. More specifically, a stopper member is press-fitted onto the inner axial member, and the stopper member is adapted to abut against the mounting cylinder of the suspension arm, thereby providing a first stopper mechanism that limits relative displacement of the inner axial member against the outer cylindrical member to one side in the axial direction.

However, since the stopper member constituting the first stopper mechanism is fitted into the inner axial member only by pressing, it is difficult to secure enough resistance force to prevent the stopper member from slipping out in the axial direction. Therefore, if the stopper member is hit hard by the mounting cylinder of the suspension arm due to an input of a shockingly large load, the stopper member may possibly be displaced off the inner axial member to the other side in the axial direction, thus creating a risk that the stopper effect in the axial direction by the first stopper mechanism would not be exerted stably. As a result, there were some occasions when targeted running stability of the vehicle or durability of the main rubber elastic body could not be obtained sufficiently.

SUMMARY OF THE INVENTION

It is therefore one object of this invention to provide a vibration damping bushing of novel construction that is able to limit relative displacement of the inner axial member against the outer cylindrical member in the axial direction in a stable manner, by preventing the stopper member from slipping out from the inner axial member. The present invention also provides a method of manufacturing the vibration damping bushing.

A first mode of the present invention provides a vibration damping bushing including: an inner axial member; an outer cylindrical member through which the inner axial member is inserted; a main rubber elastic body elastically connecting the inner axial member and the outer cylindrical member; and a stopper member that is fitted onto the inner axial member as a component of a first stopper mechanism that limits a displacement of the inner axial member against the outer cylindrical member to one side in an axial direction, wherein the inner axial member is formed with a latching depression that opens toward an outer periphery thereof, and the stopper member is provided with a latching piece that protrudes outward in the axial direction, and wherein the latching piece is engaged with the latching depression so as to provide a slipping out prevention mechanism for preventing the stopper member from slipping out from the inner axial member.

According to the vibration damping bushing with the structure of the first mode, slipping out of the stopper member from the inner axial member caused by abutment reaction force can be prevented by a slipping out prevention mechanism when the stopper member abuts against other members (on the outer cylindrical member side). Since this slipping out prevention mechanism is realized by the abutted engagement between the latching piece provided in the stopper member and the latching depression provided in the inner axial member in the axial direction, it can obtain effective resistance force against slipping out of the stopper member from the inner axial member. Therefore, the clearance between the stopper member and other members is maintained so as to stably exert a targeted stopper action.

A second mode of the present invention provides the vibration damping bushing according to the first mode, wherein the latching depression is made in a form of a groove that continuously extends all around the inner axial member.

According to the second mode, it is possible to mount the stopper member without positioning it relative to the inner axial member in the circumferential direction, thus making the mounting of the stopper member easier. In addition, since the latching depression can easily be made in a stable form, manufacturing of the vibration damping bushing related to the present invention is made easier.

A third mode of the present invention provides the vibration damping bushing according to the first or second mode, wherein the latching piece is made in an annular form that continuously extends all around the stopper member.

According to the third mode, positioning of the stopper member relative to the inner axial member in the circumferential direction is unnecessary so that the mounting of the stopper member to the inner axial member becomes easier. In addition, it allows the latching piece to be made in a desired form in a stable and easy way, thus enabling to manufacture the vibration damping bushing more easily.

Especially, when the latching depression and the latching piece both continuous all around the periphery are used in combination, it is possible to configure a slipping out prevention mechanism by engaging the latching depression and the latching piece all around the periphery, thus enabling the slipping out prevention mechanism to obtain substantial resistance force against slipping out based on latching.

A fourth mode of the present invention provides the vibration damping bushing according to one of the first to third modes, wherein an axially inward portion of an inner surface of the latching depression is made to be a sloping surface gradually sloping outward in a transaxial direction as the sloping surface goes inward in the axial direction.

According to the fourth mode, the inner peripheral surface of the latching piece and the sloping surface of the latching depression are tightly overlapped with each other without a substantial space in between, whereby foreign matters such as rain water are prevented from entering between these overlapped inner peripheral surface of the latching piece and the sloping surface of the latching depression. As a result, any damage caused by corrosion of the latching depression or latching piece is prevented, thus improving the durability of the slipping out prevention mechanism.

A fifth mode of the present invention provides the vibration damping bushing according to one of the first to fourth modes, wherein relative displacement of the inner axial member against the outer cylindrical member to one side in the axial direction is limited by the first stopper mechanism, while the inner axial member is provided with a flange portion extruding outward in a transaxial direction, and a second stopper mechanism limiting relative displacement of the inner axial member against the outer cylindrical member to another side in the axial direction is configured containing the flange portion.

According to the fifth mode, relative displacement of the inner axial member against the outer cylindrical member is limited on both sides of the axial direction by the first and second stopper mechanism. This helps to realize improvements in durability of the main rubber elastic body and running stability of the vehicle. In addition, since the second stopper mechanism is formed using the flange portion provided in the inner axial member, the stopper mechanism on either side of the axial direction is realized only by a small number of components, thus avoiding significant structural complications.

A sixth mode of the present invention provides a manufacturing method of the vibration damping bushing according to any one of the first to fifth modes, comprising: (a) a step for inserting the inner axial member provided with the latching depression in place into the outer cylindrical member, and elastically connecting the inner axial member and the outer cylindrical member to each other by the main rubber elastic body; (b) a step for preparing the stopper member provided with the latching piece, (c) a step for positioning the stopper member by being fitted onto the inner axial member, and (d) a step for constituting the slipping out prevention mechanism by axially engaging the latching piece with the latching depression by means of fitting a cylindrical jig provided, along an inner periphery thereof, with a tapered surface having a diameter gradually increasing outward in the axial direction onto the inner axial member, axially abutting the tapered surface of the cylindrical jig against the latching piece of the stopper member positioned relative to the inner axial member, and bending in a protrusion tip of the latching piece into the latching depression.

By means of the manufacturing method of the vibration damping bushing according to the sixth mode, it is possible to configure a slipping out prevention mechanism by engaging the latching piece with the latching depression by means of abutting the tapered surface of the cylindrical jig against the latching piece in the axial direction and causing the latching piece to undergo plastic deformation by the tapered surface to bend it in into the latching depression. Therefore, in configuring the slipping out prevention mechanism, there is no need for processing the latching piece in the radial direction like the all-around squeeze, thus simplifying the processing operation.

Moreover, since the latching piece is deformed in the radial direction by the abutment of the cylindrical jig in the axial direction, it is rather easy to deform the latching piece equally on the circumference, thus stabilizing the form of the latching piece after deformation. Therefore, the resistance force of the slipping out prevention mechanism against slipping out based on the engagement between the latching piece and the latching depression is exerted stably.

A seventh mode of the present invention provides the manufacturing method of the vibration damping according to the sixth mode, wherein a step portion is provided on the outer periphery of the inner axial member, and a positioning mechanism, which regulates relative displacement of the stopper member against the inner axial member inward in the axial direction by means of an abutment of the cylindrical jig, is configured by an abutment of the stopper member against the step portion.

According to the seventh mode, when the tapered surface of the cylindrical jig is abutted against the latching piece in the axial direction, displacement of the stopper member from a targeted mounting position on the inner axial member caused by pressing pressure exerted on the latching piece (stopper member) by the cylindrical jig can be prevented. Therefore, the stopper member is mounted to the right position on the inner axial member to exert a targeted stopper effect and a vibration damping effect.

Moreover, the positioning of the stopper member relative to the inner axial member is realized by the positioning mechanism using the step portion of the inner axial member, which renders any special component or jig for positioning unnecessary. Therefore, it is possible to avoid structural complications or an increase in the number of manufacturing processes due to the increase in the number of components, thus enabling to simplify the operation without any need for a setup operation to a jig and the like.

According to the present invention, the slipping out prevention mechanism is configured by having the latching piece engaged with the latching depression in the axial direction, and the displacement of the stopper member from the inner axial member toward the slipping out side in the axial direction is prevented. Therefore, the stopper effect is effectively exerted by the abutment of the stopper member against the outer cylindrical member, thus achieving improvements in durability and running stability by means of limiting relative displacement between the inner axial member and the outer cylindrical member.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 5A and 5B are views for explaining a method of manufacturing the vibration damping bushing shown in FIG.

1, wherein FIG. 5A indicates a situation where a cylindrical jig is fitted onto an inner axial member, and FIG. 5B indicates a situation where the cylindrical jig is abutted against a latching piece.

DETAILED DESCRIPTION OF PREFERRED EMBODIMENTS

Figure 1:
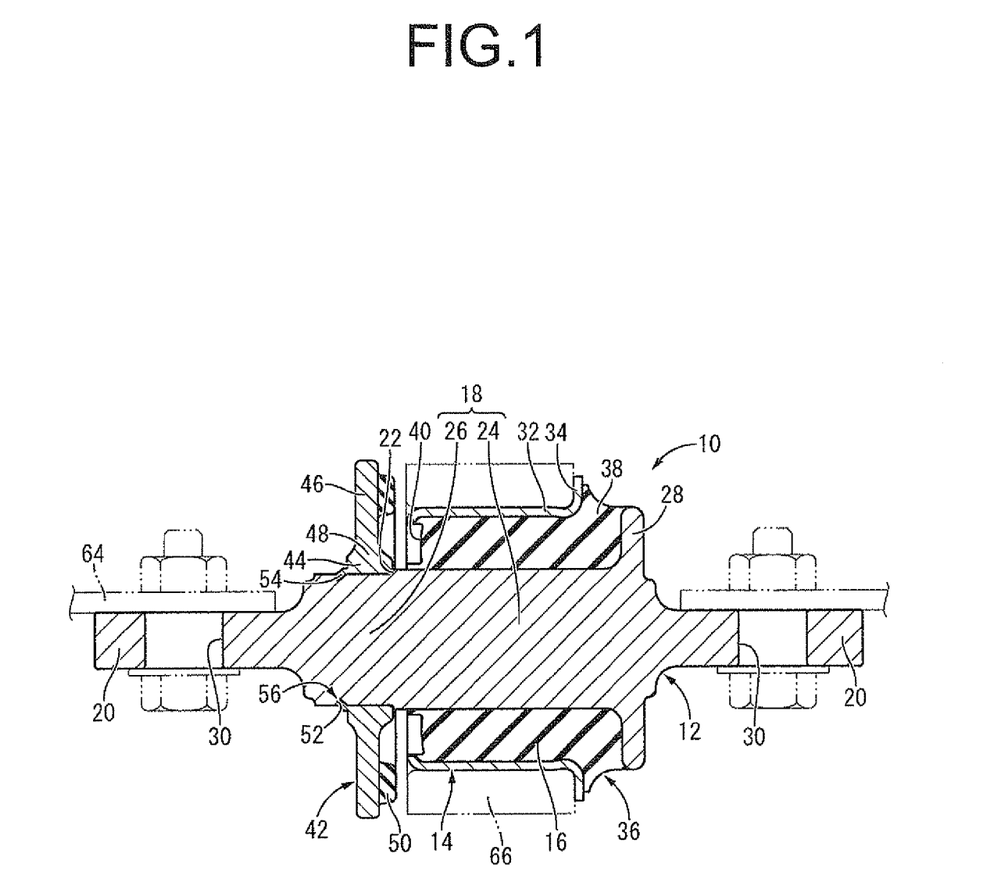
FIG. 1 is a longitudinal cross sectional view of a vibration damping bushing as an embodiment of the present invention.

FIG. 1 shows a suspension bushing 10 for a motor vehicle as an embodiment of the vibration damping bushing with the structure according to the present invention. The suspension bushing 10 has a structure wherein an inner axial member 12 is inserted through an outer cylindrical member 14, while these inner axial member 12 and outer cylindrical member 14 are elastically connected with each other by a main rubber elastic body 16. In the following descriptions, the axial direction generally means the left-right direction in FIG. 1. In FIG. 1, the suspension bushing 10 is indicated by solid lines whereas a vehicular body 64 (including bolts and nuts for mounting) and a mounting cylinder 66, which will be described later, are indicated by two-dotted lines.

More specifically, the inner axial member 12 is a high-rigidity member made of metal materials such as iron and aluminum alloy and the like and is integrally provided with a central main body 18 in an approximate form of a cylinder and a pair of mounting portions 20, 20 protruding from the central main body 18 to both sides in the axial direction.

The central main body 18 is a solid member extending in the axial direction with a cross-section in an approximate form of a circle, wherein an annular step portion 22 is provided in the middle thereof in the axial direction, and one side of the step portion 22 (right side in FIG. 1) in the axial direction is made to be a larger-diameter portion 24 while the other side (left side in FIG. 1) in the axial direction is made to be a smaller-diameter portion 26. Further, near one end of the central main body 18 in the axial direction, a flange portion 28 in an annular form protruding outward in the transaxial direction is integrally formed. The step portion 22 is provided at a location biased from the center of the central main body 18 toward the other side in the axial direction.

The pair of mounting portions 20, 20, on the other hand, are in a form of plates similar to each other extending outward from the central main body 18 in the axial direction, each with the thickness aligned in the same direction. In addition, at the center of each mounting portion 20, a bolt hole 30 is formed penetrating through the thickness thereof. The shape of the mounting portion 20 in a vertical view (up-down view in FIG. 1) is not particularly limited, and a pair of mounting portions 20, 20 can be different from each other in shape.

The outer cylindrical member 14, as a whole, is in an approximate form of a thin cylinder with a large diameter and is a high-rigidity member made of metal materials similar to those of the inner axial member 12. The outer cylindrical member 14 has a cylindrical portion 32 in a form of a cylinder, one end of which in the axial direction is provided with an abutting portion 34 in a flange form protruding outward in the transaxial direction, while the other end of the cylindrical portion 32 in the axial direction is bent toward the inner periphery. The outer cylindrical member 14 integrally provided with the cylindrical portion 32 and the abutting portion 34 is easily available by applying a bending process by means of press work, for example, to both ends of the cylindrical metal material in the axial direction.

The inner axial member 12 is inserted through the outer cylindrical member 14. The central main body 18 of the inner axial member 12 is arranged on the same central axis as the cylindrical portion 32 of the outer cylindrical member 14 to be separated therefrom by a given distance in the radial direction. The pair of mounting portions 20, 20 are arranged protruding outward to both sides of the outer cylindrical member 14 in the axial direction.

Figure 2:
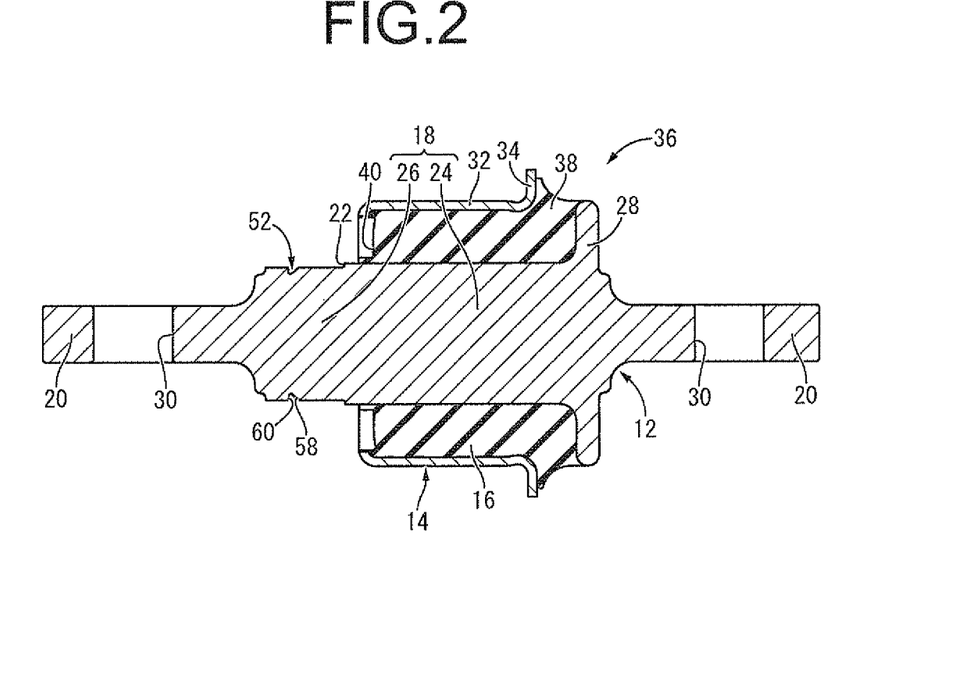
FIG. 2 is a longitudinal cross sectional view of an integrated vulcanized molding component constituting the vibration damping bushing shown in FIG. 1.

Between the inner axial member 12 and the outer cylindrical member 14 in the above-described arrangement, the main rubber elastic body 16 is disposed. The main rubber elastic body 16 is in an approximate form of a thick cylinder with a large diameter, and its inner peripheral surface is bonded by vulcanization to the outer peripheral surface of the central main body 18 of the inner axial member 12, while its outer peripheral surface is bonded by vulcanization to the inner peripheral surface of the cylindrical portion 32 of the outer cylindrical member 14. This allows the inner axial member 12 and the outer cylindrical member 14 to be elastically connected by the main rubber elastic body 16. In the present embodiment, the main rubber elastic body 16 is formed as an integrated vulcanized molding component 36 provided with the inner axial member 12 and the outer cylindrical member 14 (see FIG. 2).

At one end of the main rubber elastic body 16 in the axial direction, a rubber stopper 38 in a flange form is integrally formed. One end of this rubber stopper 38 in the axial direction is bonded by vulcanization to the flange portion 28 of the inner axial member 12, while the other end in the axial direction is bonded by vulcanization to the abutting portion 34 of the outer cylindrical member 14, being interposed between the flange portion 28 and the abutting portion 34. The outer peripheral surface of the rubber stopper 38 is made to be a concave curve with a decreasing diameter toward one side in the axial direction.

Further, at the other end of the main rubber elastic body 16 in the axial direction, a cut-out portion 40 is formed. The cut-out portion 40 is a depression that extends in an annular form with a near-constant cross-section in the middle of the main rubber elastic body 16 in the radial direction and opens up at the other end of the main rubber elastic body 16 in the axial direction.

Figure 3:
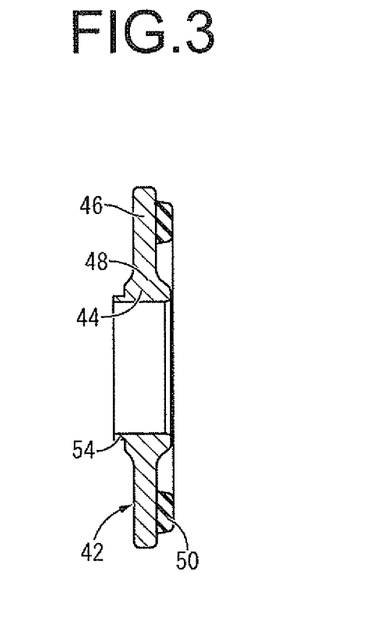
FIG. 3 is a longitudinal cross sectional view of a stopper member constituting the vibration damping bushing shown in FIG. 1.

The inner axial member 12 is provided with a stopper member 42 fitted thereon as a separate element. The stopper member 42, as shown in FIG. 3, is a high-rigidity member made of iron and aluminum alloy and the like in an approximate form of an annular plate. The stopper member 42 has a thicker inner peripheral portion 44 than an outer peripheral portion 46, while the inner peripheral portion 44 and the outer peripheral portion 46 extend with near-constant thicknesses different from each other, which are integrally formed via a tapered portion 48 gradually increasing in thickness toward the inner periphery.

On the outer peripheral portion 46 of the stopper member 42, a rubber buffer 50 is firmly fixed. The rubber buffer 50 is a rubber elastic body in an annular form continuing along the periphery with a near-constant cross-section and is bonded by vulcanization to the outer peripheral portion 46 of the stopper member 42 to be installed on one side thereof in the axial direction.

The stopper member 42 provided with the rubber buffer 50 is mounted to the inner axial member 12 of the integrated vulcanized molding component 36. In other words, the stopper member 42 is fitted onto the inner axial member 12 from the other side in the axial direction and press-fitted onto the smaller-diameter portion 26 of the central main body 18. Further, the stopper member 42 is positioned in the axial direction relative to the inner axial member 12 by having the inner peripheral portion 44 abut against the step portion 22 in the axial direction.

Between the inner axial member 12 and the stopper member 42, a slipping out prevention mechanism 56 is configured to prevent the stopper member 42 from slipping out from the inner axial member 12 in the axial direction by use of a latching depression 52 provided in the inner axial member 12 and a latching piece 54 provided in the stopper member 42.

The latching depression 52 is a groove (annular groove) that opens up on the outer peripheral surface of the inner axial member 12 continuously extending all around the periphery thereof. The latching depression 52 is formed in the middle of the smaller-diameter portion 26 of the central main body 18 in the axial direction. In the inner surface of the latching depression 52, the portion located on the inner side (one side) in the axial direction is made to be a sloping surface 58 that gradually slopes up outward in the transaxial direction toward one side in the axial direction. Further, in the inner surface of the latching depression 52, the portion located on the outer side (the other side) in the axial direction is made to be a latching surface 60 in an annular form that extends approximately in the transaxial direction. The latching depression 52 has a smooth inner surface wherein the sloping surface 58 and the latching surface 60 are continuously provided via the concave curve surface in between.

The latching piece 54 is made in an annular or cylindrical form that continuously extends all around the periphery of the stopper member 42, protruding outward in the axial direction (the other side in the axial direction) from the edge of the inner peripheral surface of the stopper member 42. The latching piece 54, as shown in FIG. 3, is in a cylindrical form that extends in the axial direction with a near-constant diameter prior to the assembly of the stopper member 42 to the inner axial member 12 described later.

Figure 4:
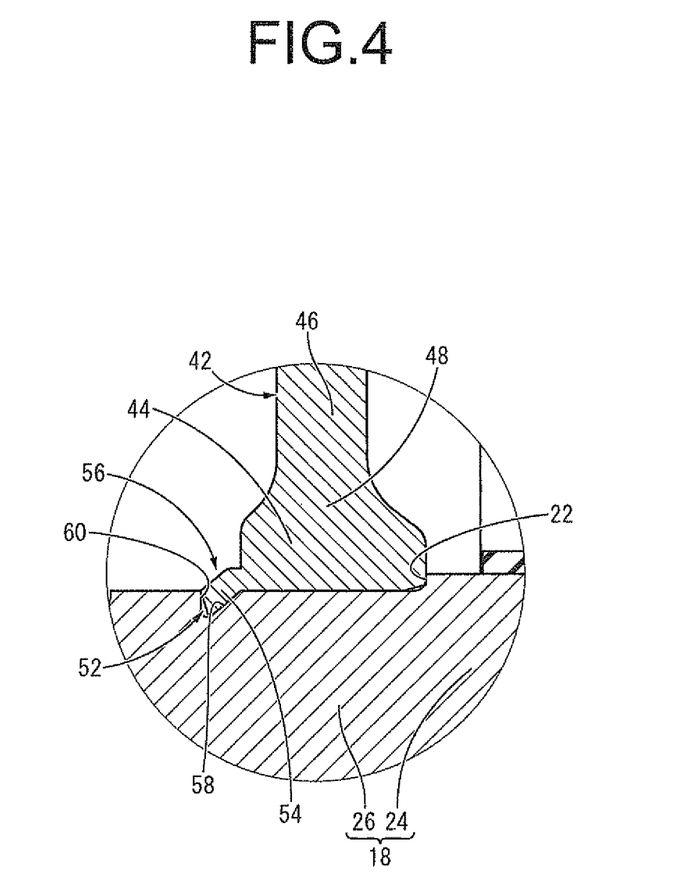
FIG. 4 is an enlarged partial cross sectional view of a key portion of the vibration damping bushing shown in FIG. 1.

When the stopper member 42 is assembled to the inner axial member 12, the latching piece 54 is processed into a tapered form with a diameter gradually decreasing toward the tip thereof (see FIG. 4). This allows the latching piece 54 to be bent into the latching depression 52 wherein the end surface of the protrusion of the latching piece 54 and the latching surface 60 of the latching depression 52 abut against each other in the axial direction along the outer periphery and these latching depression 52 and the latching piece 54 are engaged in the axial direction. As a result, slipping out of the stopper member 42 from the inner axial member 12 to the other side in the axial direction is restricted by the engagement between the latching piece 54 and the latching depression 52, and thus the slipping out prevention mechanism 56 that prevents the stopper member 42 from slipping out from the inner axial member 12 in the axial direction is configured containing the latching piece 54 and the latching depression 52.

The inclination angle of the sloping surface 58 in the latching depression 52 is set to align with the inclination of the latching piece 54, and the gap between the inner peripheral surface of the latching piece 54 and the sloping surface 58 of the latching depression 52 is made to be very small with these surfaces in an almost close contact. The inclination angle of the latching piece 54 and the sloping surface 58 is not particularly limited, but considering the processing workability, it is preferably set in a range of 15°-60° relative to the axis and at around 45° in the present embodiment.

The suspension bushing 10 with the structure described above has the inner axial member 12 fixed to the vehicular body 64 by bolts and the like and is installed in a vehicle by having the outer cylindrical member 14 press-fitted into the mounting cylinder 66 of the suspension arm. Thus, the suspension arm is supported in a vibration damping fashion by the vehicular body 64 by having the suspension bushing 10 interposed between the suspension arm and the vehicular body 64 in the suspension mechanism.

Under such mounting condition of the suspension bushing 10 to the vehicle, when the inner axial member 12 has substantial relative displacement against the outer cylindrical member 14 to one side in the axial direction due to a shockingly large load inputted during the vehicle operation on a rough road, the stopper member 42 abuts against the mounting cylinder 66 of the suspension arm via the rubber buffer 50. This restricts relative displacement of the inner axial member 12 against the outer cylindrical member 14 to one side in the axial direction, thus achieving improvements in running stability of the vehicle, and prevention of damages to the main rubber elastic body 16. As evident from the above, in the suspension bushing 10, a first stopper mechanism that limits relative displacement of the inner axial member 12 against the outer cylindrical member 14 to one side in the axial direction is configured by the abutment between the stopper member 42 and the mounting cylinder 66 via the rubber buffer 50 in between.

In the present embodiment, it is not only that the stopper member 42 is press-fitted onto the inner axial member 12 but also that the slipping out prevention mechanism 56 is provided wherein the latching piece 54 of the stopper member 42 is engaged with the latching depression 52 of the inner axial member 12. Therefore, even if the stopper member 42 is firmly abutted against the mounting cylinder 66 due to an input of a shockingly large load, relative displacement of the stopper member 42 against the inner axial member 12 outward in the axial direction (to the left in FIG. 1) is prevented, thus effectively exerting a targeted stopper effect.

Further, the inner surface of the latching depression 52 inward in the axial direction (to the right in FIG. 1) is made to be the sloping surface 58 where the inner peripheral surface of the latching piece 54 is overlapped in an almost close contact. This prevents foreign matters such as water from entering between the inner peripheral surface of the latching piece 54 and the latching depression 52, thus improving the durability of components.

In addition, the inner surface of the latching depression 52 to the outer side in the axial direction (to the left in FIG. 1) is made to be the latching surface 60 that extends approximately in the transaxial direction. Therefore, a positioning action by latching (resistance force against slipping out) of the slipping out prevention mechanism 56 is effectively obtained to prevent stopper member 42 from slipping out from the inner axial member 12.

The latching depression 52 formed on the inner axial member 12 is made to be an annular groove that continuously extends in the circumferential direction, while the latching piece 54 formed on the stopper member 42 is made in an annular or cylindrical form. This renders the positioning of the stopper member 42 relative to the inner axial member 12 in the circumferential direction unnecessary, thus enabling to assemble the stopper member 42 to the inner axial member 12 in an easy way.

Moreover, since the latching depression 52 and the latching piece 54 are both formed all around the periphery, the slipping out prevention mechanism 56 is provided all around the periphery. Therefore, it is possible to obtain effective resistance force against slipping out of the stopper member 42 from the inner axial member 12 by means of the slipping out prevention mechanism 56.

Further, the stopper member 42 has a thicker inner peripheral portion 44 than an outer peripheral portion 46 so that the press-fitting area of the stopper member 42 against the inner axial member 12 is secured large. Therefore, the action of positioning the stopper member 42 relative to the inner axial member 12 based on the press-fitting can be favorably exerted.

Displacement of the stopper member 42 relative to the inner axial member 12 to the other side in the axial direction is limited by the abutting of the stopper member 42 against the step portion 22 and the engagement of the latching piece 54 with the sloping surface 58.

On the other hand, relative displacement of the inner axial member 12 against the outer cylindrical member 14 to the other side in the axial direction is limited by the abutment of the flange portion 28 of the inner axial member 12 against the outer cylindrical member 14 via the rubber stopper 38. Therefore, relative displacement between the inner axial member 12 and the outer cylindrical member 14 in the axial direction is limited on both sides of the axial direction, thus improving running stability of the vehicle and durability of the main rubber elastic body 16. As evident from the above, in the suspension bushing 10, a second stopper mechanism that limits relative displacement of the inner axial member 12 against the outer cylindrical member 14 to the other side in the axial direction is realized by having the rubber stopper 38 significantly pressed between the flange portion 28 and the outer cylindrical member 14 in the axial direction. A substantial portion of the rubber stopper 38 to be compressed is secured large to favorably exert the stopper effect by making the diameter of the rubber stopper 38 gradually increase toward the abutting portion 34 of the outer cylindrical member 14.

The rubber stopper 38 disposed between the flange portion 28 of the inner axial member 12 and the outer cylindrical member 14 in the axial direction is fixed to both the flange portion 28 and the outer cylindrical member 14. This allows the rubber stopper 38 to function as a compression spring and the spring is adjusted in the axial direction when the inner axial member 12 is displaced from the outer cylindrical member 14 to the other side in the axial direction, thus enabling to obtain targeted vibration damping performance and running stability and so forth.

The suspension bushing 10 according to the present embodiment provided with the slipping out prevention mechanism 56 described above is manufactured, for example, in the following way:

In other words, the inner axial member 12 provided with the latching depression 52 and the outer cylindrical member 14 are prepared first and set in a metal mold for the main rubber elastic body 16, which is filled with the rubber material to make a vulcanized molding of the main rubber elastic body 16. This allows the inner axial member 12 and the outer cylindrical member 14 to be elastically connected by the main rubber elastic body 16 to complete a process of manufacturing the integrated vulcanized molding component 36.

After setting the stopper member 42 provided with the latching piece 54 in the metal molding for the rubber buffer 50, the rubber material is filled in the cavity of the metal molding to make a vulcanized molding of the rubber buffer 50. This completes the process of preparing the stopper member 42 provided with the rubber buffer 50. At this time, the latching piece 54 as a whole including the tip portion is made in a form of a cylinder extending in the axial direction, not in a tapered form.

Once the outer cylindrical member 14 of the integrated vulcanized molding component 36 is press-fitted against the mounting cylinder 66 of the suspension arm from one side in the axial direction, the stopper member 42 is press-fitted against the inner axial member 12 from the other side in the axial direction. In doing this, a positioning mechanism is configured regulating relative displacement of the stopper member 42 against the inner axial member 12 inward in the axial direction by abutting the stopper member 42 against the step portion 22 of the inner axial member 12, and the latching piece 54 is arranged on the latching depression 52. This completes the process of positioning the stopper member 42 relative to the inner axial member 12 fitting thereon.

Considering slight compression of the latching piece 54 in the axial direction subsequent to the pressure by a cylindrical jig 68 described later, the positioning can be made in such a way that the protrusion tip of the latching piece 54 before deformation protrudes beyond the opening of the latching depression 52 in the axial direction. According to this method, the gap between the protrusion end surface of the latching piece 54 after deformation and the latching surface 60 of the latching depression 52 is made smaller, thus preventing foreign matters from entering therein.

Figure 5A:
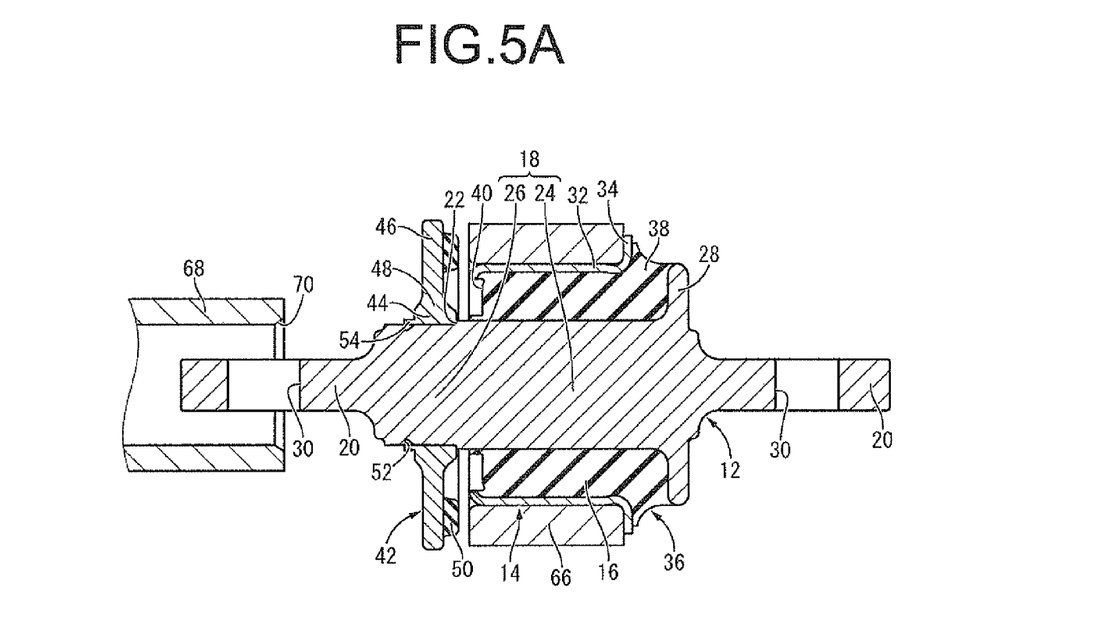
Figure 5B:
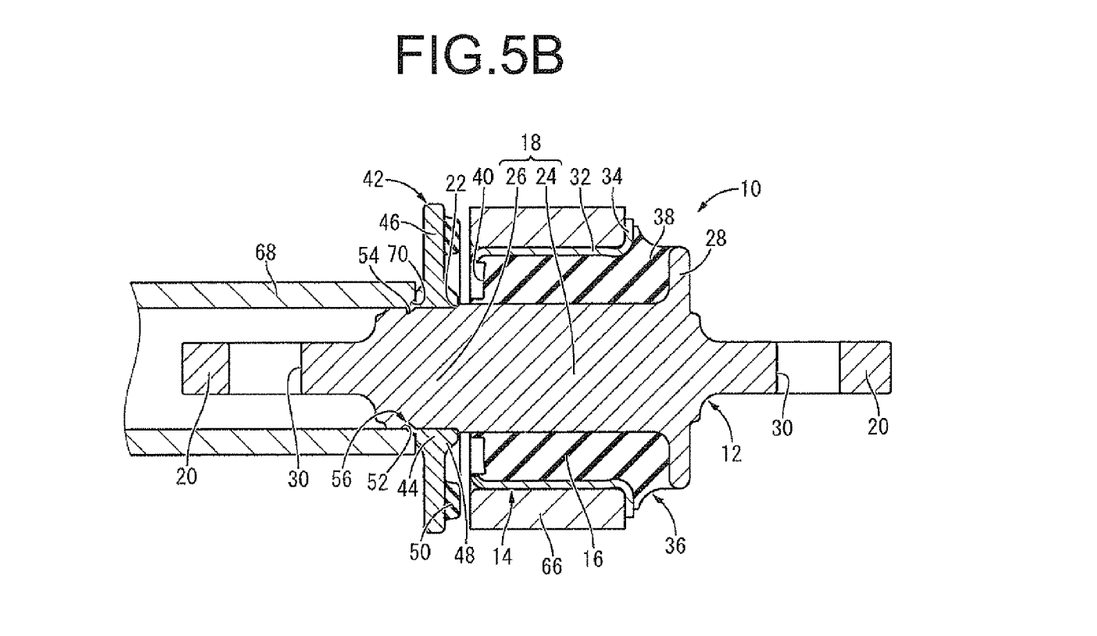

Thereafter, as shown in FIG. 5A, the cylindrical jig 68 is fitted onto the inner axial member 12 from the other side in the axial direction. This cylindrical jig 68 is in a form of a cylinder with its inner diameter approximately equal to the outer diameter of the smaller-diameter portion 26 of the inner axial member 12 at least in the end situated on the side thereof to be fitted onto the inner axial member 12 (one end in the axial direction), and the inner peripheral surface of one end in the axial direction is made to be a tapered surface 70. This tapered surface 70 preferably has a diameter gradually increasing outward in the axial direction, and the maximum diameter at the end in the axial direction is made larger than the outer diameter of the protrusion tip of the latching piece 54. Other than the form of a plane sloping at a near-constant angle relative to the axis, as shown in FIGS. 5A and 5B, the tapered surface 70 can also adopt a form of a curved surface with the inclination angle varying continuously against the axial direction, or a form of a polygonal surface with the inclination angle varying in steps against the axial direction.

Then, by moving the cylindrical jig 68 to one side in the axial direction, the tapered surface 70 of the cylindrical jig 68 is abutted against the latching piece 54 of the stopper member 42 in the axial direction. This causes the protrusion tip of the latching piece 54 to plastically deform, as shown in FIG. 5B so as to drop down toward the inner periphery along the slope of the tapered surface 70 to let the latching piece 54 enter into the latching depression 52 of the inner axial member 12. This allows the latching piece 54 to be engaged with the latching depression 52 in the axial direction to complete the process of configuring the slipping out prevention mechanism 56.

Lastly, upon removing the cylindrical jig 68 by moving it to the other side in the axial direction, the suspension bushing 10 with the structure according to the present embodiment can be obtained.

Under a situation where the outer cylindrical member 14 can be mounted to the mounting cylinder 66 after the stopper member 42 is fixed to the inner axial member 12, such as when the mounting cylinder 66 has a combined structure of a pair of members each having a semicircular tube form, for example, the outer cylindrical member 14 can be mounted to the mounting cylinder 66 after completing the suspension bushing 10 by fixing the stopper member 42 to the inner axial member 12.

Thus, according to the method of manufacturing the suspension bushing 10 related to the present embodiment, it is possible to process the latching piece 54 into a tapered form to engage it with the latching depression 52 using the guiding action of the tapered surface 70 provided on the cylindrical jig 68 by means of abutting the cylindrical jig 68 against the latching piece 54 in the axial direction. Therefore, as a processing jig for engaging the latching piece 54 with the latching depression 52, the cylindrical jig 68 with a simpler structure can be adopted to manufacture the suspension bushing 10 at a low cost. Moreover, a targeted post-processing form of the latching piece 54 can be stably obtained through a simple processing operation of abutting the cylindrical jig 68 against the latching piece 54 in the axial direction.

Further, the inner axial member 12 is provided with the step portion 22, against which the stopper member 42 is abutted by press-fitting the stopper member 42 onto the inner axial member 12. This allows the stopper member 42 to be positioned relative to the inner axial member 12 without slipping off even if the cylindrical jig 68 is pressed against the latching piece 54 in the axial direction, which exerts a reaction force effectively against the pressing force by the cylindrical jig 68. Therefore, the stopper member 42 can be installed at a desired location on the inner axial member 12 while maintaining the stability of the post-processing form of the latching piece 54. In addition, the positioning mechanism is configured by the abutment of the step portion 22 of the inner axial member 12 against the stopper member 42, which renders any special component or jig for positioning unnecessary so that the stopper member 42 can easily be positioned relative to the inner axial member 12 with a simple structure.

An embodiment of the present invention has been described in detail above, but the present invention is not limited to those specific descriptions. For example, the cross-sectional form of the latching depression 52 is not necessarily limited to the one described in the above embodiment, but a rectangular or a semicircular form can be adopted.

The latching depression 52 is not limited to the annular groove continuing all around the periphery, but for example, it can be a depression or the like partially provided along the periphery. Further, the latching piece 54 does not have to be in an annular or cylindrical form continuing along the periphery, but for example, it can be in a plate form or the like partially provided along the periphery. Not to mention that a combination of a partial latching depression and a partial latching piece is adoptable, a combination of the latching depression 52 in an annular form and a partial latching piece is also adoptable, while it is further possible to adopt a combination of a partial latching depression and the latching piece 54 in an annular form to partially deform the latching piece 54 to be latched therein.

In the embodiment described above, the step portion 22 was provided on the inner axial member 12 in order to obtain a reaction force against the pressure force by the cylindrical jig 68, but for example, the reaction force can be obtained by supporting the stopper member 42 by another jig during the processing of the latching piece 54 using the cylindrical jig 68, in which case the step portion 22 of the inner axial member 12 is negligible.

In the embodiment described above, the first stopper mechanism that limits relative displacement between the inner axial member 12 and the outer cylindrical member 14 in the axial direction was configured by the abutment of the stopper member 42 against the mounting cylinder 66 via the rubber buffer 50, but the first stopper mechanism can be realized, for example, using the abutment between the stopper member 42 and the outer cylindrical member 14.

In the embodiment described above, the second stopper mechanism that limits displacement of the inner axial member 12 relative to the outer cylindrical member 14 to the other side in the axial direction was configured containing the flange portion 28 integrally formed with the inner axial member 12. However, it is also possible to adopt a different structure as a second stopper mechanism. More specifically, a second stopper mechanism with approximately the same structure as that of the first stopper mechanism, for example, can be provided by applying a structure similar to the left half to the right half of the inner axial member 12 and mounting the stopper member 42 also to the right half. As another structure, for example, the second stopper mechanism can be configured in such a way that the flange portion 28 is more protruded toward the outer periphery and arranged so as to overlap with the abutting portion 34 of the outer cylindrical member 14 on a projected image in the axial direction, while the rubber stopper 38 is removed from the main rubber elastic body 16 so that the second stopper mechanism is configured by the abutment of the flange portion 28 and the abutting portion 34. The second stopper mechanism is not indispensable and can be omitted if durability of the main rubber elastic body 16 and running stability of the vehicle are secured.

The form of the inner axial member 12 at the mounting portion of the stopper member 42 to is not limited to a solid cylinder but can be a thick cylinder with a smaller diameter and so forth.

The present invention is applied not only to vibration damping bushings for motor vehicles but also applied favorably to vibration damping bushings for motorcycles, railroad vehicles, and industrial vehicles. Further, in the embodiment described above, the suspension bushing 10 used at the joint portion between the suspension arm and the vehicular body 64 is illustrated as an example, and the vibration damping bushing related to the present invention is not limited to the one used for said portion, but the present invention can also be applied favorably to the torque rod bushings and the like.

What is claimed is:
1. A vibration damping bushing comprising:
an inner axial member;
an outer cylindrical member through which the inner axial member is inserted;
a main rubber elastic body elastically connecting the inner axial member and the outer cylindrical member; and
a stopper member that is fitted onto the inner axial member as a component of a first stopper mechanism that limits relative displacement of the inner axial member against the outer cylindrical member to one side in an axial direction,
wherein the inner axial member is formed with a latching depression that opens toward an outer periphery thereof, and the stopper member is integrally provided with an annular latching piece that protrudes outward in the axial direction,
a protrusion tip of the annular latching piece is bent into the latching depression and the annular latching piece is engaged with the latching depression in the axial direction so as to provide a slipping out prevention mechanism for preventing the stopper member from slipping out from the inner axial member,
the inner axial member includes a central main body of solid cylindrical shape and a pair of mounting portions protruding from the central main body to both sides in the axial direction,
the outer cylindrical member is disposed on an outer peripheral side of the central main body of the inner axial member, and an inner peripheral surface of the main rubber elastic body is directly bonded by vulcanization to an outer peripheral surface of the central main body of the inner axial member, while an outer peripheral surface of the main rubber elastic body is directly bonded by vulcanization to an inner peripheral surface of the outer cylindrical member, the pair of mounting portions protrude outward to both sides of the outer cylindrical member in the axial direction and a bolt hole is formed penetrating through each mounting portion in a direction orthogonal to the axial direction of the inner axial member, and the stopper member is press-fitted onto the outer peripheral surface of the inner axial member at a position between the outer cylindrical member and the mounting portion on the one side in the axial direction of the inner axial member, and the stopper member is integrally provided with the latching piece.

2. The vibration damping bushing according to claim 1, wherein the latching depression is made in a form of a groove that continuously extends all around the inner axial member.

3. The vibration damping bushing according to claim 1, wherein the annular latching piece is made in an annular form that continuously extends all around the stopper member.

4. The vibration damping bushing according to claim 1, wherein an axially inward portion of an inner surface of the latching depression is made to be a sloping surface gradually sloping outward in a transaxial direction as the sloping surface goes inward in the axial direction.

5. The vibration damping bushing according to claim 1, wherein relative displacement of the inner axial member against the outer cylindrical member to the one side in the axial direction is limited by the first stopper mechanism, while the inner axial member is provided with a flange portion extruding outward in a transaxial direction, and a second stopper mechanism limiting relative displacement of the inner axial member against the outer cylindrical member to another side in the axial direction is configured containing the flange portion.

6. The vibration damping bushing according to claim 1, wherein in the axial direction of the inner axial member, the mounting portion on the one side, the stopper member, and the outer cylindrical member are separated from one another with a gap therebetween.

7. A manufacturing method of a vibration damping bushing including: an inner axial member; an outer cylindrical member through which the inner axial member is inserted; a main rubber elastic body elastically connecting the inner axial member and the outer cylindrical member; and a stopper member that is fitted onto the inner axial member as a component of a first stopper mechanism that limits relative displacement of the inner axial member against the outer cylindrical member to one side in an axial direction, wherein the inner axial member is formed with a latching depression that opens toward an outer periphery thereof, and the stopper member is integrally provided with an annular latching piece that protrudes outward in the axial direction, and wherein a protrusion tip of the annular latching piece is bent into the latching depression and the annular latching piece is engaged with the latching depression in the axial direction so as to provide a slipping out prevention mechanism for preventing the stopper member from slipping out from the inner axial member, the method comprising:

a step for inserting the inner axial member provided with the latching depression in place into the outer cylindrical member, and elastically connecting the inner axial member and the outer cylindrical member to each other by the main rubber elastic body;

a step for preparing the stopper member provided with the annular latching piece;

a step for positioning the stopper member by being fitted onto the inner axial member; and a step for constituting the slipping out prevention mechanism by axially engaging the annular latching piece with the latching depression by means of fitting a cylindrical jig provided, along an inner periphery thereof, with a tapered surface having a diameter gradually increasing outward in the axial direction onto the inner axial member, axially abutting the tapered surface of the cylindrical jig against the annular latching piece of the stopper member positioned relative to the inner axial member, and bending in the protrusion tip of the annular latching piece into the latching depression, wherein the inner axial member includes a central main body of solid cylindrical shape and a pair of mounting portions protruding from the central main body to both sides in the axial direction, the outer cylindrical member is disposed on an outer peripheral side of the central main body of the inner axial member, and an inner peripheral surface of the main rubber elastic body is directly bonded by vulcanization to an outer peripheral surface of the central main body of the inner axial member, while an outer peripheral surface of the main rubber elastic body is directly bonded by vulcanization to an inner peripheral surface of the outer cylindrical member, the pair of mounting portions protrude outward to both sides of the outer cylindrical member in the axial direction and a bolt hole is formed penetrating through each mounting portion in a direction orthogonal to the axial direction of the inner axial member, and the stopper member is press-fitted onto the outer peripheral surface of the inner axial member at a position between the outer cylindrical member and the mounting portion on the one side in the axial direction of the inner axial member, and the stopper member is integrally provided with the annular latching piece.

8. The manufacturing method according to claim 7, wherein a step portion is provided on the outer periphery of the inner axial member, and a positioning mechanism, which regulates relative displacement of the stopper member against the inner axial member inward in the axial direction by means of an abutment of the cylindrical jig, is configured by an abutment of the stopper member against the step portion.

* * * * *